INVENTORS
Harold F. Silver
Clarence R. Steele
James C. Wright
Frank B. Price

ATTORNEYS

March 28, 1961 H. F. SILVER ET AL 2,976,550
GRAB-ROLL SCREEN
Filed July 23, 1956 4 Sheets-Sheet 2

INVENTORS
Harold F. Silver
Clarence R. Steele
James C. Wright
Frank B. Price
BY
ATTORNEYS INVENTORS
Harold F. Silver
Clarence R. Steele
James C. Wright
Frank B. Price

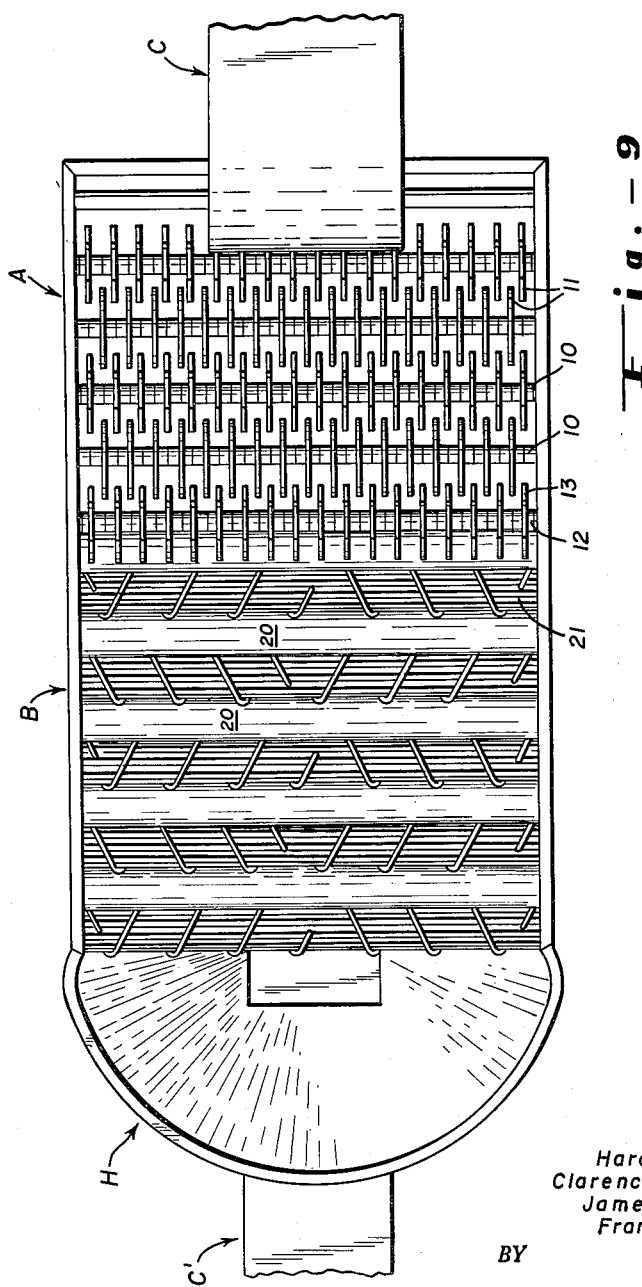

United States Patent Office 2,976,550
Patented Mar. 28, 1961

2,976,550

GRAB-ROLL SCREEN

Harold F. Silver, Clarence R. Steele, and James C. Wright, Denver, and Frank B. Price, Jefferson County, Colo., assignors to Silver Engineering Works, Inc., Denver, Colo., a corporation of Colorado Filed July 23, 1956, Ser. No. 599,526

17 Claims. (Cl. 15—3.11)

This invention relates to apparatus for separating agricultural products from foreign matter normally associated with such products which are machine harvested, and more particularly to apparatus for separating leafy trash and dirt clods from root-type agricultural products.

The mechanization of crop harvesting almost invariably increases substantially the amount of foreign matter (normally called trash), including both organic matter and dirt in the form of clods or clinging mud, associated with the harvested product. This is especially true with root crops, such as sugar beets, where mechanical harvesting must utilize a digging operation to expose the root crop. Clods of earthy matter, adhering to the roots and, also, free, are greatly increased by such mechanical operations. When the dirt clods harden, they are particularly difficult to separate by mechanical means since the majority of included clods tend to approach the size of some of the beets. Further, the mud or dirt which clings to the beets and hardens is not normally removed by any of the known screening apparatus, increasing the beet washing problems.

It is, therefore, an object of the invention to provide an effective and efficient screening apparatus for separating associated trash from agricultural products.

It is another object of the invention to provide an improved screening apparatus which separates large, hard, dirt clods from root-type products and distintegrates such clods so that they may be completely separated from the root product.

Another object of the invention is to provide a novel method of screening sugar beets where large dirt clods and other trash associated with a moving stream of beets on a conveyor are substantially stopped in the beet stream and are held until broken up for removal.

A further object of the invention is the provision of a screening device which is selective in holding dirt clods, subjecting the held clods to destructive impact forces, and passes beets with minimum obstruction along a moving beet stream.

A still further object of the invention is to provide a screen device of high capacity throughput per unit of size while maintaining a high efficiency of separation.

Another object of the invention is the provision of a screen unit which provides a positive pinch on material in the bight between adjacent roller units so that vegetable products slide out of the bight while trash is pulled through the space between the rolls.

These and other objects and advantages of the invention may be readily ascertained by referring to the following description and appended illustrations in which:

Fig. 9 is a top plan view of the screening assembly interconnected in a beet conveying and screening system.

Figure 1:
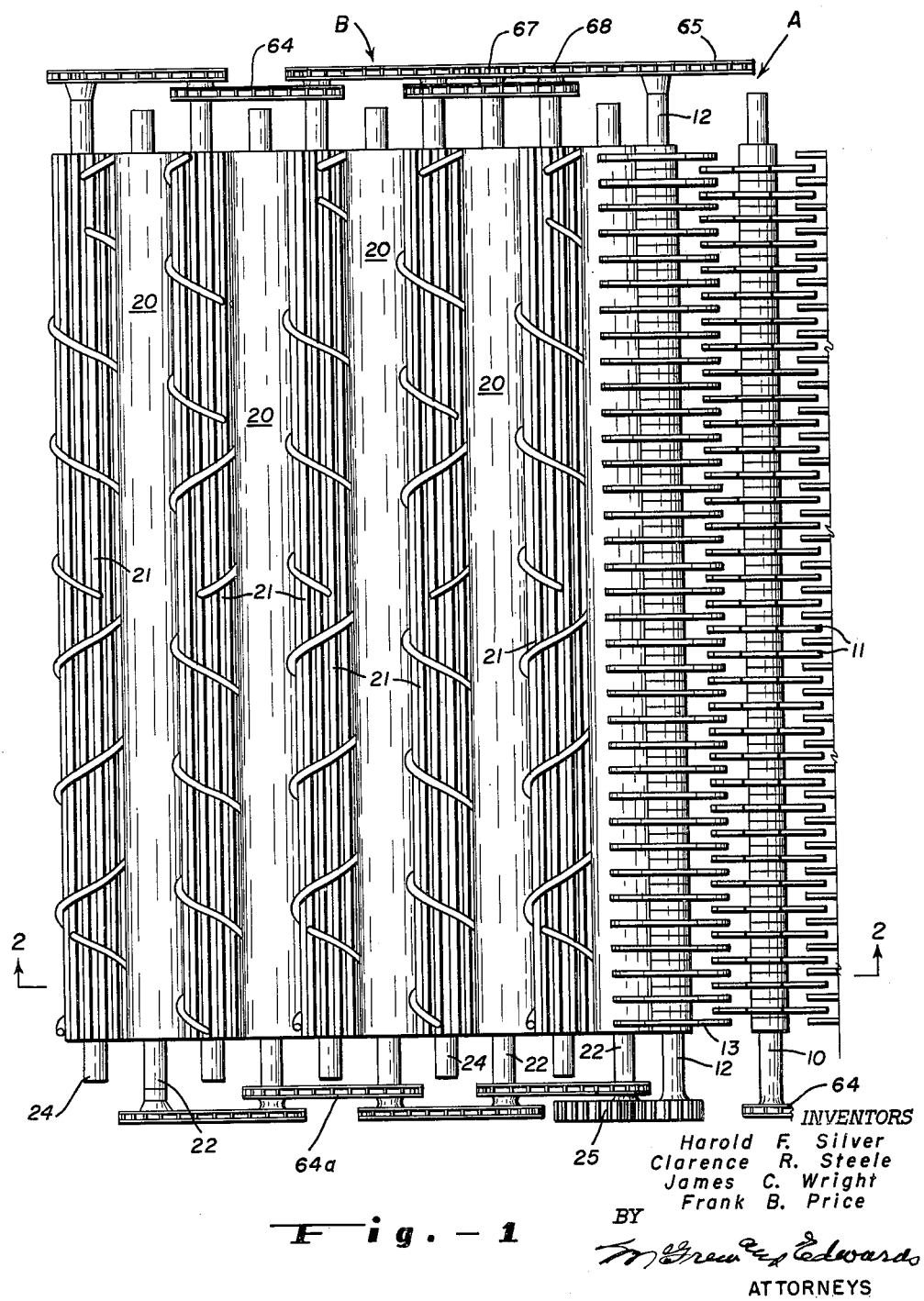
Fig. 1 is a top plan view of a screening device according to the invention.

In a preferred form, the invention is useful for screening sugar beets, and the description of the invention is directed to, but is not intended to be limited by, such illustration. The device of the invention comprises, in general, a first substantially horizontal screening surface A, Fig. 9, which removes a substantial amount of the smaller foreign paraticles associated with a harvest of beets and a second screening device B, which is inclined downwardly and forms an extension of the first screening unit. The first screening unit spreads laterally into substantially a single beet layer, a stream of beets from a conveyor C and passes the stream to the second screening unit B where large clods are held and subsequently pulverized and leafy trash is removed from the stream of beets. The beet stream then passes by gravity along the screening unit B to a point of discharge into a hopper H which feeds a second conveyor C'. The first screening unit A is a substantially perforate horizontal surface consisting of spaced and staggered wheels. The second screening unit B provides a series of elongated rotary surfaces which are rotated upwardly opposed to the downward travel of the beets. The second screening unit provides a series of bights between adjacent rotary surfaces which gather and hold clods of dirt, leafy trash and the like, and by means of impact surfaces subjects the held clods to a distintegrating action. The rotary surfaces are so arranged that beets are selectively discharged from the screening apparatus back into the stream of beets, so that only the very smallest of the beets actually pass through the screen with the trash.

In a preferred form, the first screening stage A is a horizontal perforated screen unit made substantially in accordance with U.S. Patent No. 2,670,846, issued March 2, 1954, to George W. Rienks and Harold F. Silver, for Apparatus for Screening Sugar Beets and the Like. This screening unit comprises a plurality of rotary units mounted on shafts, four of such shafts 10, as shown in Fig. 9, having a plurality of agitating kickers 11 mounted thereon while the final shaft 12 has a plurality of agitating wheels 13 mounted thereon. The number of shafts 10 with the agitating kickers varies from unit to unit depending on the particular requirements. The shafts are so arranged that the agitating kickers are overlapped, forming a substantially horizontal surface for propelling the beets. The shafts of the kickers are rotated simultaneously by drive means, not shown. These kicker wheels not only propel the beets forwardly in the direction of the second screening unit, but, also, laterally so as to spread the beets coming from the relatively narrow conveyor C. Fine material and a certain amount of leafy trash is thus removed from the beet stream, falling through the spaces between the wheels. The beets pass over the agitating wheels 13 in an action more gentle than over the kickers 11 onto the secondary screening unit B. The spacing of the wheels and kickers on the shaft is such that small beets and large pieces of earthy clods or trash cannot pass through into a trash reject, not shown, which is mounted below the unit.

The screening unit B is mounted on upright frame members 15, 17, and includes a horizontal upper frame member 18 and a diagonal frame member 16, all shown in dashed lines for clarity. The screen unit comprises a plurality of cylindrical members 20 alternately mounted between squirrel cage members 21 generally along the lateral frame support 16. The rotary members 20 and 21 are mounted on substantially horizontal stub shafts 22, 24, 31 and 37, respectively, which are spaced along the diagonal frame 16 so as to provide a downwardly inclined screen member. The rotary members are driven by means of chain sprocket drives, shown in general by numeral 64, one at each end thereof, both of which are interconnected with the upper screen unit.

Figure 8:
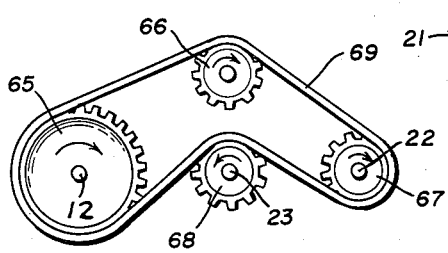
Fig. 8 is a schematic view of a drive arrangement for the two screen sections of the invention.

The drive mechanism for the squirrel cage members is illustrated schematically in Fig. 8, where a drive sprocket 65 is interconnected to shaft 12, which is the shaft of the agitating wheels 13, and rotates in a clockwise direction. A chain 69 is laced around idlers 66 (not shown in Fig. 1) and 67, and over driven wheel 68. The driven wheel 68 is mounted on shaft 23 of the upper squirrel cage member of the B screen unit. On the opposite side of the unit, a gear drive 25 is interconnected with the upper smooth roller member 20. The arrangement rotates the squirrel cage and the roller members in a reverse direction to that of the upper screen units. One set of chain drives 64 interconnects the squirrel cage members to the corresponding driven member, while another set of chain drives 64a interconnects the smooth roller members with the driven smooth roller.

Figure 5:
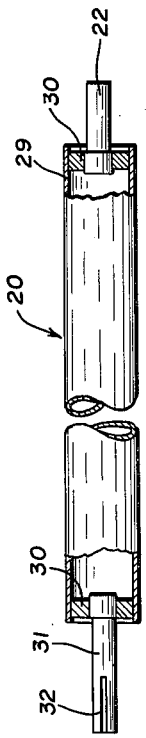
Fig. 5 is a plan view, in partial section, of a screen member according to the invention.

Each of the cylindrical members 20 includes, shown in detail in Fig. 5, a cylindrical shell 29, the ends of which are enclosed by end members 30 which support a stub shaft 22 at one end thereof and a stub drive shaft 31 at the opposite end thereof. The drive shaft 31 includes a keyway 32 for keying a drive gear or sprocket thereon. The cylindrical shell 29 may be a plain steel shell or it may be covered with a resilient material such as rubber, neoprene, or the like.

Figure 3:
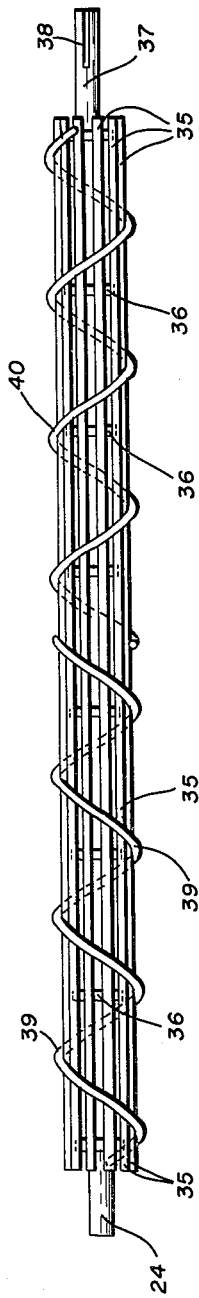
Fig. 3 is a plan view of one form of an impact producing screen member according to the invention.

The squirrel cage members include a plurality of rod-like sections 35, shown in Fig. 3, mounted in peripheral arrangement on circular support members 36. A stub shaft 24 is mounted at one end of the squirrel cage and a stub drive shaft 37 is mounted at the opposite end thereof, and a keyway 38 is cut in the drive stub shaft 37 for attaching a driving member thereto. Around the peripheral members is wound a scroll member 39 at one end and a scroll member 40 at the opposite end. In one particular form, the scrolls are wound in opposite directions. In the squirrel cage device of Fig. 3, the scrolls are wound from the outside toward the center. In the device illustrated in Fig. 4, the scroll members comprise short sections which extend approximately three quarters of the way around the scroll, and are oppositely wound from section to section. One section 41 extends about three quarters of the way around the periphery of the members 35, and an adjacent scroll member 42, which starts about a half a turn from the one end of the scroll member 41, extends approximately three fourths of the way around the periphery of the members 35. The next scroll section is identical with the scroll section 41 but it starts about a quarter of a turn beyond the ending of the first section. In a like manner, the scroll sections extend across the lengthwise extent of the squirrel cage unit. With the device of Fig. 3, material is continuously pushed centerwise from the ends, and with the device of Fig. 4, material is alternately pushed centerwise and then endwise, giving a different type of action. The scroll may be made in many forms, both continuous and discontinuous, and with different windings to perform various functions.

In operation of the device, beets from a hopper, not shown, are fed onto an endless belt conveyor C which feeds a stream of beets on the first screen A. The beets on the screening unit A are propelled forwardly toward the screening unit B and laterally across the lengthwise extent of the screen so as to provide a substantially single layer beet stream passing over the kicker wheels 13 onto the screening unit B. The beets passing onto the screening unit B travel downwardly along the inclined screening unit into a hopper H which feeds a conveyor C′ which may pass the beets to a piler, loader, or the like, and may be any suitable type of endless belt conveyor.

Figure 2:
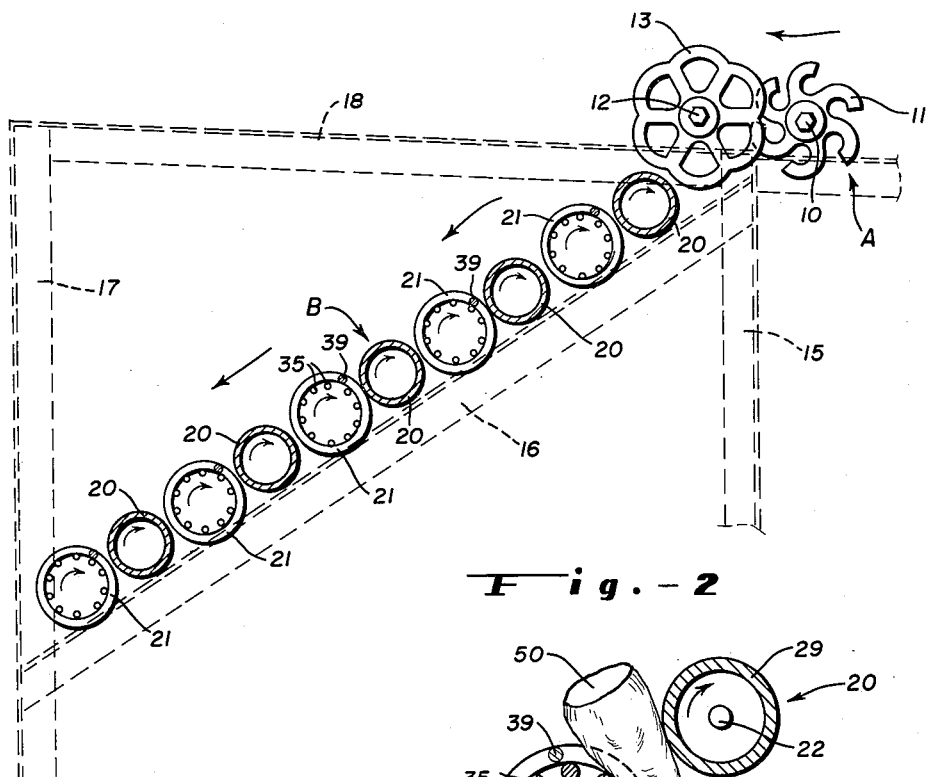
Fig. 2 is a side elevation of the screening device of Fig. 1.
Figure 6:
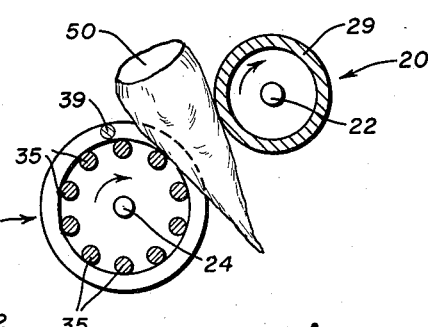
Fig. 6 is a schematic cross sectional view of a small segment of the screen, illustrating the action of the screen on a root product.
Figure 7:
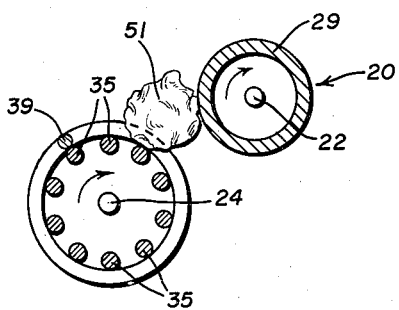
Fig. 7 is a schematic cross section of a section of a screen illustrating the action of a screen device on a dirt clod.

The action of screening unit B is illustrated in detail in the slightly exaggerated schematic views of Figs. 6 and 7. In Fig. 6, a beet 50 is shown with its pointed end extending through the bight between a squirrel cage member 21 and a cylindrical member 20, the distance between the members being shown further apart than in the form shown in Fig. 2, to accentuate the action. The bight between each tube and squirrel cage member tends to catch smaller objects, while passing larger objects. The squirrel cage member 21 and cylindrical member 20 rotate in the same direction, that is clockwise, so that the rotation is generally upwardly against the downward flow of beets. As the squirrel cage 21 rotates at a higher speed than the roller 20, and, also, due to the irregular surface of the squirrel cage, there is a definite pinching action between the members. The slower moving roller tends to control the pinching effect. By varying the speed of the roller, the pinching effect may be varied substantially. This pinching effect is important in segregating the vegetable products from trash. With a root, such as a sugar beet, caught in the bight between the members, dirt is knocked off the root by the squirrel cage. As the root is pinched, its skin is broken and it becomes slick, sliding readily on the members. As the scroll section comes into contact with the beet it pushes it sidewise and literally ejects it out of the bight. A clod of dirt when pinched does not become slick, and it will not readily move so it is subjected to strong impact action of the squirrel cage members and the scroll.

A clod of dirt 51 caught in the bight, shown in exaggerated detail in Fig. 7 to accentuate the action of the screening, is readily pulverized by the impact of the peripheral members and the scroll. Since the clod does not become slick under the pinching action it does not slide readily and the pinching becomes greater. The impact of the squirrel cage and the scroll disintegrates the clods and the dirt falls through the spaces between them.

A beet caught in the bight between the rollers is moved back and forth by the oppositely-wound scrolls, and since the center of gravity of the beet is substantially above the impact points, the impact of the scroll, as the beet is transferred from one scroll section to the oppositely-wound section, tends to eject the beet upwardly out of the bight. A dirt clod which is caught in the bight and which is not disintegrated immediately is also moved back and forth by the oppositely-wound scrolls, but since its center of gravity is considerably closer to the points of impact of the scrolls, as it is transferred from one scroll section to the oppositely-wound section, there results a crushing action on the clod with less tendency to eject the clod from the bight.

The beets falling over screen members, also, hit the held clods, providing additional impact to help break the clods. The squirrel cage members tend to scrub the beets as they travel along the screen, helping to remove clinging dirt clods even through the beets are too large to be caught in the bight.

In a preferred form, the rolls of the screen section B are set at an angle between 30 and 35 degrees. However, the screen device operates efficiently between 20 and 45 degrees inclination below the horizontal. The squirrel cage rollers preferably rotate at a higher speed than the smaller, smooth cylindrical rolls. For a particular operation, the squirrel cage may operate at about 100 r.p.m. while the cylindrical member operates at about 25. In another efficient screening operation, the squirrel cage may be operated at 200 r.p.m. while the smooth rolls are operated at 50. The ratio of 4 to 1 is effective for many operations. The pinching action of the rotating members is effective in this range for sugar beets. In certain cases, the smooth rolls may be free rotating rolls while the squirrel cages are the driven rollers. The important thing is that the down motion of the squirrel cage roll through the bight produces a pinching action and the severity of the pinching action is controlled by the upward motion of the smooth cylindrical roll. This pinching action may be so controlled, by controlling the rate of rotation of both sets of rollers, so as to be selective in pinching dirt clods sufficiently to disintegrate them and pinching the vegetable only sufficiently to eject it from the screen.

With the squirrel cage roller of Fig. 3, clods which are caught in the bight between the squirrel cage and its adjacent smooth roller are progressively passed from each end toward the center. As the clod progresses toward the center, it may be momentarily stopped by beets striking it as they pass over the screen, so that clods generally do not travel completely along with the spiral. The angle of attack of the scroll is, also, a factor in the disintegration since it determines the number of turns on the member and the direction of the forces of impact. At the higher revolution speeds of the squirrel cage roll the clod does not slide readily along the smooth roller and it may not be propelled along by the scroll. Therefore, the scroll strikes the clod knocking off a part of it and passes under the remainder. A clod is generally disintegrated before it passes very far along the bight between the two rolls.

Figure 4:
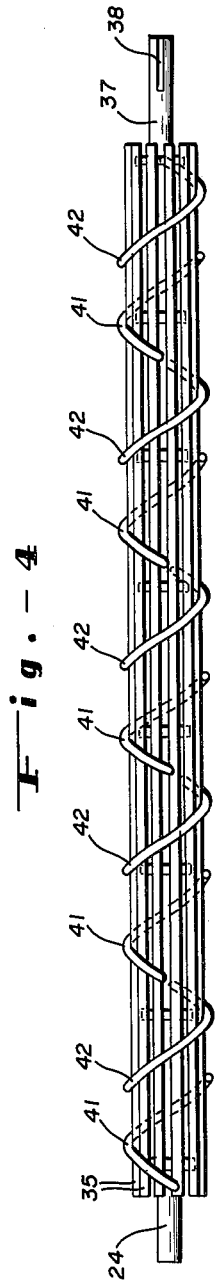
Fig. 4 is a plan view of a modified impact-producing member according to the invention.

With the scroll, as illustrated in Fig. 4, any clod which lodges in the bight between the squirrel cage and its adjacent smooth roller is propelled back and forth between the scroll sections rather than in a single direction along the lengthwise extent from one end to the other, or from the end to the center. Where the scroll is arranged so that clods and beets are continuously propelled away from the side walls, the screening device generally provides a more efficient action.

In one extended test comparing the screening efficiency with a common screen available in commercial channels, a screening device, made in accordance with a preferred embodiment of the present invention, removed 79.5 percent of the trash from the beets, while the known commercial screen only removed 47 percent of the trash from the beets. Since the beets are gathered from all sections of a particular locale, and by all different methods, the amount of trash in the beets will range from six to forty percent on a weight basis.

Although the screening apparatus has been described with the squirrel cage rolls with scrolls extending around the periphery thereof, a screening unit which utilizes the squirrel cage members without the scrolls may operate efficiently for certain types of agricultural products. Earthy and leafy trash will fall through the openings between the rolls and clods will be held in the bight between the rolls. The squirrel cage rod members will strike the clods and will provide multiple impact forces to break the clods. Since the rolls are rotating upwardly, they tend to oppose the gravitational flow of the products along the surface of the screening unit and the products contacting the revolving squirrel cage rolls will be wiped clean of clinging dirt and mud.

In a typical installation for sugar beets, such as the one for which tests are described above, each cylindrical squirrel cage member 21 is constructed of three-quarter inch steel rod, and has an outside diameter of six inches. Each roll 20, likewise, has an outside diameter of six inches. The shafts of the squirrel cages and the tubes are mounted on a common plane and are spaced 7 3/16 inches apart. The outside surfaces of the tubes and squirrel cage members are thus 1 3/16 inches apart. The scroll members are made of three-quarter inch steel rod and are wound around squirrel cage members as described. The space between the outside periphery of the scroll and the tube is 7/16 inch. Ends of beets of a diameter less than the distance apart of an adjacent squirrel cage and tube (1 3/16 inches) may enter the space or bight between such members, but as explained above, are rejected by the action of the squirrel cage and its attached scroll. Dirt clods broken up by the action drop through the squirrel cage and through the space between the squirrel cage and tube.

While the invention has been illustrated by reference to specific illustrations, there is no intent to limit the invention to the precise details so set forth except insofar as defined in the following claims.

We claim:

1. In beet screening apparatus, the combination of at least two screening units, each arranged to pass clods and leaves of variable size and to reject beets of variable size, each unit comprising an elongated rotary member having a smooth surface, and a second elongated rotary squirrel-cage member having helical projections on its exterior surface, said members being mounted on substantially horizontal axes transverse to the flow of beets being screened by said units and having their peripheral surfaces spaced to pass earth and leaves and to reject substantially all beets in said flow, said projections being constructed and arranged to enter said space during said rotation and impart an agitative movement to the beets lengthwise of said members while impacting clods and leaves and directing a following downward movement thereto, and means for driving the members having said helical surfaces.

2. In beet screening apparatus, the combination of at least two screening units, each arranged to pass clods and leaves of variable size and to reject beets of variable size, each unit comprising an elongated rotary member having a smooth resilient surface, and a second elongated rotary squirrel-cage member having helical projections on its exterior surface, said members being mounted on substantially horizontal axes transverse to the flow of beets being screened by said units and having their peripheral surfaces spaced to pass earth and leaves and to reject substantially all beets in said flow, said projections being constructed and arranged to enter said space during said rotation and impart an agitative movement to the beets lengthwise of said members while impacting clods and leaves and directing a following downward movement thereto, and means for driving the members having said helical surfaces.

3. In beet screening apparatus, the combination of at least two screening units, each arranged to pass clods and leaves of variable size and to reject beets of variable size, each unit comprising an elongated rotary member having a smooth surface, and a second elongated rotary squirrel-cage member having oppositely wound helical projections on its exterior surface, said members being mounted on substantially horizontal axes transverse to the flow of beets being screened by said units and having their peripheral surfaces spaced to pass earth and leaves and to reject substantially all beets in said flow, said projections being constructed and arranged to enter said space during said rotation and impart an agitative movement to the beets lengthwise of said members while impacting clods and leaves and directing a following downward movement thereto, and means for driving the members having said helical surfaces.

4. In beet screening apparatus, the combination of at least two screening units, each arranged to pass clods and leaves of variable size and to reject beets of variable size, each unit comprising an elongated rotary member having a smooth surface, and a second elongated rotary squirrel-cage member having a plurality of segments forming helical projections on its exterior surface, said members being mounted on substantially horizontal axes transverse to the flow of beets being screened by said units and having their peripheral surfaces spaced to pass earth and leaves and to reject substantially all beets in said flow, said projections being constructed and arranged to enter said space during said rotation and impart an agitative movement to the beets lengthwise of said members while impacting clods and leaves and directing a following downward movement thereto, and means for driving the members having said helical surfaces.

5. A screen according to claim 4, in which the helical member is formed of a plurality of alternating, oppositely wound segments.

6. In beet screening apparatus, the combination of at least two screening units, each mounted and arranged to pass clods and leaves of variable size and to reject beets of variable size, each unit comprising an elongated rotary member having a smooth surface, and a second elongated rotary member having at least two oppositely wound helical projections on its exterior surface so placed that beets moved away from one said projection are intercepted by an oppositely wound projection so as to reverse the direction of their movement, said members being mounted on substantially horizontal axes transverse to the flow of beets being screened by said units and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets lengthwise of said members while impacting clods and leaves and directing a following downward movement thereto due to the placement of said projections, and means for driving the members having said helical surfaces.

7. A screen as defined in claim 6, in which the members of each pair rotate in the same direction.

8. A screen as defined in claim 6, in which the members having the helical surfaces are rotated approximately four times as fast as the other members.

9. A screen as defined in claim 6, in which one member of the pair is a larger diameter than the other.

10. In beet screening apparatus, the combination of at least two screening units, each mounted and arranged to pass clods and leaves of variable size and to reject beets of variable size, each unit comprising an elongated rotary member having a smooth surface, and a second elongated rotary member having at least two oppositely wound helical projections on its exterior surface so placed that beets moved away from one said projection are intercepted by an oppositely wound projection so as to reverse the direction of their movement, said members being mounted on substantially horizontal axes transverse to the flow of beets being screened by said units and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets lengthwise of said members while impacting clods and leaves and directing a following downward movement thereto due to the placement of said projections, the adjoining members of successive units being arranged for upward movement of the helical projections through the space therebetween so as to advance the material to the next screening unit, and means for driving the members having said helical surfaces.

11. In beet screening apparatus, the combination of at least two screening units, each mounted and arranged to pass clods and leaves of variable size and to reject beets of variable size, each unit comprising an elongated rotary member having a smooth surface, and a second elongated rotary member having at least two oppositely wound helical projections on its exterior surface, so placed that beets moved away from one said projection are intercepted by an oppositely wound projection so as to reverse the direction of their movement, said members being mounted on substantially horizontal axes transverse to the flow of beets being screened by said units and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets lengthwise of said members while impacting clods and leaves and directing a following downward movement thereto due to the placement of said projections, and means for driving said members of each unit at different speeds.

12. In beet screening apparatus, the combination of at least two screening units, each mounted and arranged to pass clods and leaves of variable size and to reject beets of variable size, each unit comprising an elongated rotary member having a smooth surface, and a second elongated rotary member having at least two oppositely wound helical projections on its exterior surface so placed that beets moved away from one said projection are intercepted by an oppositely wound projection so as to reverse the direction of their movement, said members being mounted alternately on substantially horizontal axes transverse to the flow of beets being screened by said units and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets lengthwise of said members while impacting clods and leaves and directing a following downward movement thereto due to the placement of said projections, and means for driving the member carrying the helical surfaces at a greater speed than the other said member.

13. In beet screening apparatus, the combination of at least two screening units, each mounted and arranged to pass clods and leaves of variable size and to reject beets of variable size, each unit comprising an elongated rotary member having a smooth surface, and a second elongated rotary member having oppositely wound helical projections on its exterior surface so placed that beets moved away from one said projection are intercepted by an oppositely wound projection so as to reverse the direction of their movement, the helical projections on the members of successive units being similarly wound, said members being mounted on substantially horizontal axes transverse to the flow of beets being screened by said units and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets lengthwise of said members while impacting clods and leaves and directing a following downward movement thereto due to the placement of said projections, and means for driving the members having said helical surfaces.

14. In beet screening apparatus, a screening unit mounted and arranged to pass clods and leaves of variable size and to reject beets of variable size, comprising in combination, an elongated rotary member having a smooth surface, and a second elongated rotary member having helical projections on its exterior surface forming at least two oppositely wound scrolls, each said scroll comprising a plurality of sections disposed in closely spaced end-to-end relation so placed that beets moved away from one said projection are intercepted by an oppositely wound projection so as to reverse the direction of their movement, said members being mounted on substantially horizontal axes transverse to the flow of beets being screened and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets in opposite directions lengthwise of the members while impacting and directing a following downward movement to clods and leaves due to the placement of the projections, and means for driving the member having the helical projections.

15. In beet screening apparatus, a screening unit mounted and arranged to pass clods and leaves of variable size and to reject beets of variable size, comprising in combination, an elongated rotary member having a smooth surface, and a second elongated rotary member having helical projections on its exterior surface formed by at least two oppositely wound scroll sections so placed that beets moved away from one said projection are intercepted by an oppositely wound projection so as to reverse the direction of their movement, said members being mounted on substantially horizontal axes transverse to the flow of beets being screened and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets in opposite directions lengthwise of the members while impacting and directing a following downward movement to clods and leaves due to the placement of the projectitons, and means for driving the member having the helical projections.

16. In beet screening apparatus, a screening unit mounted and arranged to pass clods and leaves of variable size and to reject beets of variable size, comprising in combination, an elongated rotary member having a smooth surface, and a second elongated rotary member having helical projections on its exterior surface formed by at least two oppositely wound scroll sections spaced approximately 180° circumferentially of said rotary member at their ends so placed that beets moved away from one said projection are intercepted by an oppositely wound projection so as to reverse the direction of their movement, said members being mounted on substantially horizontal axes transverse to the flow of beets being screened and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets in opposite directions lengthwise of the members while impacting and directing a following downward movement to clods and leaves due to the placement of the projections, and means for driving the member having the helical projections.

17. In beet screening apparatus, a screening unit mounted and arranged to pass clods and leaves of variable size and to reject beets of variable size, comprising in combination, an elongated rotary member having a smooth surface, and a second elongated rotary member having helical projections on its exterior surface formed by at least two oppositely wound scroll sections spaced approximately 180° circumferentially of rotary member at their ends so placed that beets moved away from one said projection are intercepted by an oppositely wound projection so as to reverse the direction of their movement and providing substantially continuous impact surfaces throughout the length of said member, said members being mounted on substantially horizontal axes transverse to the flow of beets being screened and having their peripheral surfaces spaced to pass earth and leaves and to reject substantially all beets in said flow, said projections being constructed and arranged as a result of rotation of said second rotary member to enter downwardly into said space during said rotation and at the same time impart an oscillatory agitation to the beets in opposite directions lengthwise of the members while impacting and directing a following downward movement to clods and leaves due to the placement of the projections, and means for driving the member having the helical projections.

References Cited in the file of this patent

UNITED STATES PATENTS

| 1,346,931 | Adams | July 20, 1920 |
| 1,766,340 | Kendall | June 24, 1930 |
| 1,895,268 | Silver | Jan. 24, 1933 |
| 1,899,292 | Rienks | Feb. 28, 1933 |
| 2,244,546 | Stockdale | June 3, 1941 |
| 2,357,892 | Grant | Sept. 12, 1944 |
| 2,479,961 | Paul | Aug. 23, 1949 |
| 2,565,559 | Hurdlebrink | Aug. 28, 1951 |
| 2,604,206 | Armer | July 2, 1952 |
| 2,618,385 | Silver et al. | Nov. 18, 1952 |
| 2,624,458 | Molnau | Jan. 6, 1953 |
| 2,670,846 | Rienks et al. | Mar. 2, 1954 |

FOREIGN PATENTS

| 1,162,833 | France | Apr. 14, 1958 |